June 16, 1964
C. L. MARSOT
3,137,413
CLOSURE FOR FLUID-STORAGE CONTAINERS
Filed April 5, 1962
2 Sheets-Sheet 1
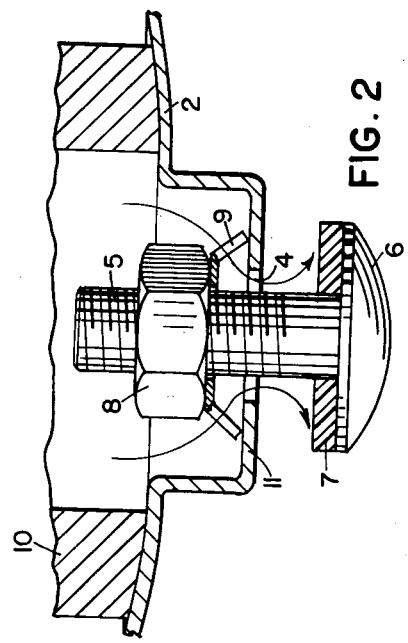
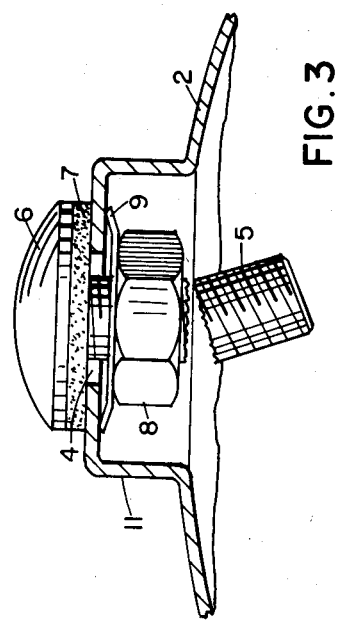
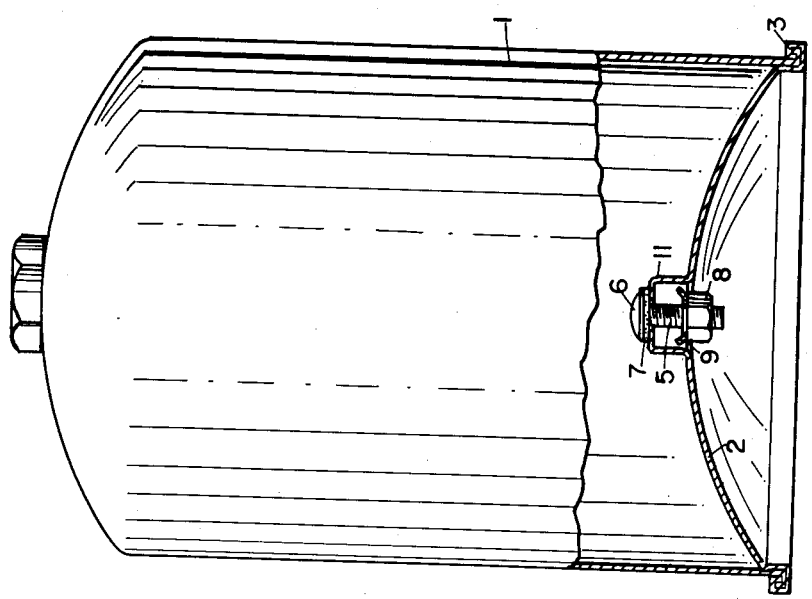
Charles L. Marsot
INVENTOR.
BY *Karl F. Ross*
AGENT.

June 16, 1964     C. L. MARSOT     3,137,413
CLOSURE FOR FLUID-STORAGE CONTAINERS
Filed April 5, 1962     2 Sheets-Sheet 2

Charles L. Marsot
INVENTOR.

BY Karl F. Ross

AGENT.

United States Patent Office 3,137,413
Patented June 16, 1964

3,137,413
CLOSURE FOR FLUID-STORAGE CONTAINERS
Charles Louis Marsot, 152 Ave. des Champs Elysees,
Paris, France
Filed Apr. 5, 1962, Ser. No. 185,395
Claims priority, application France Apr. 18, 1961
6 Claims. (Cl. 222—91)

My present invention relates to closure means adapted to be used for the filling and the subsequent sealing of storage containers for fluids, e.g. portable canisters filled with butane or similar heating and cooking gas to be used as camping equipment, as a fuel supply for blow torches or as a heat source for any other purpose.

The general object of my invention is to provide, on such container, means for providing an inlet for the introduction of a fluid and, after completion of the charge, for securely sealing this inlet to prevent the escape of the stored fluid.

A more particular object of this invention is to provide closure means of this type adapted to permit only a single charge, thus removing from the user any temptation to carry out the usually dangerous operation of refilling the container with combustible gas.

Another specific object of the instant invention is to provide on such container a seal which, after remaining inviolate for a desired storage period, can be pierced and equipped with a valve-controlled outlet for the discharge of the fluid.

A further object of my invention is to provide an efficient method of sealing a charging aperture in a container filled, by way of such aperture, with a fluid to be stored.

In accordance with the present invention I provide, within an aperture originally present in one of the container walls (preferably a recessed portion of one of its end walls), a bolt projecting with its shank outwardly from such aperture while having a head within the container adapted to overlie the aperture under pressure from the stored fluid; a resilient insert surrounds the projecting shank and, after the container has been filled through the clearance present between the shank and the aperture, bears on the container wall under pressure from a nut tightened against the bolt to seal the inlet. Advantageously, a gasket is interposed between the bolt head and the container wall to improve the seal.

If the container has been or can be fitted with an independent outlet for the discharge of the fluid, the projecting shank portion can be cut off just beyond the nut to form a burr which will lock the nut in place and will prevent its unscrewing from the bolt. According to another feature of my invention, however, I may use a bolt of tubular configuration with a closed outer end which can be pierced by a pointed tubular projection on a valve attachment to be screwed directly onto the free extremity of the bolt shank to facilitate the withdrawal of fluid from the container.

The invention will be described in greater detail with reference to the accompanying drawing in which:

FIG. 1 is a side-elevational view (parts broken away) of an unfilled canister provided with a closure assembly according to the invention;

FIG. 2 is a fragmentary sectional view of the bottom of the canister of FIG. 1 in inverted position, showing the closure assembly on a larger scale during a filling operation;

FIG. 3 is a view similar to FIG. 2, showing the assembly with the same orientation as in FIG. 1 but after completion of the seal;

Figure 4:
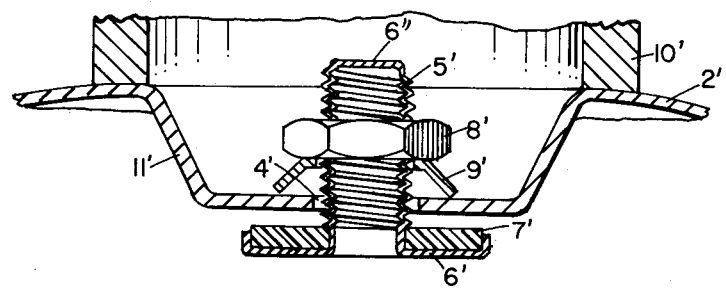
FIG. 4 is a view, similar to FIG. 2, of a modified assembly according to the invention during the filling operation.

The canister shown in FIG. 1 is provided with an inwardly curved bottom wall 2 which is joined to the peripheral wall of the canister along a crimped edge 3. A bolt 5 is inserted into a central aperture 4 of a re-entrant portion 11 of the bottom wall 2 before the latter is joined to the peripheral wall. The head 6 of bolt 5, disposed within the canister 1, overlies the aperture 4 with an initially loose fit whereby, as indicated by the arrows in FIG. 2, gas can enter the interior of the canister through the clearance left within aperture 4 by the bolt 5. The free, outer extremity of the shank of bolt 5 carries a nut 8 held spaced from the inner surface of the recessed bottom portion 11 by a resilient member 9, such as a three-legged spring washer, during the filling operation which may proceed with the aid of a charging tube 10, as illustrated in FIG. 2, in the inverted position of the canister 1. An annular gasket 7 surrounds the bolt 5 next to its head 6.

When charging is completed, the nut 8 is screwed tight onto the shank of bolt 5 which may be held by hand or by a pair of pliers during this operation, the nut 8 receding completely into the wall of the canister bottom while moving into its clamping position. After the spring washer 9 has been flattened sufficiently to hold the head 6 firmly against bottom portion 11 through the intermediary of gasket 7, the seal may be made permanent by a severing of the projecting shank portion of bolt 5, e.g. with the aid of a hacksaw, as shown in FIG. 3. The resulting burr on the remainder of the shank, close to nut 8, locks the latter to the bolt and prevents any unblocking of the gas passage through aperture 4 as any attempt at unscrewing the nut 8 will at most result in an ineffectual rotation of the assembly 5–9 as a unit. It will also be apparent that the internal gas pressure of the canister 1 will reinforce the resilient pressure of washer 9 to force the head 6 against the wall portion 11.

In the arrangement of FIGS. 1–3 it has been assumed that suitable means for discharging the stored fluid can be provided on some point of canister 1 remote from closure 5–9. Where this is not practical, the assembly shown in FIGS. 4 and 5 will be particularly advantageous.

Figure 5:
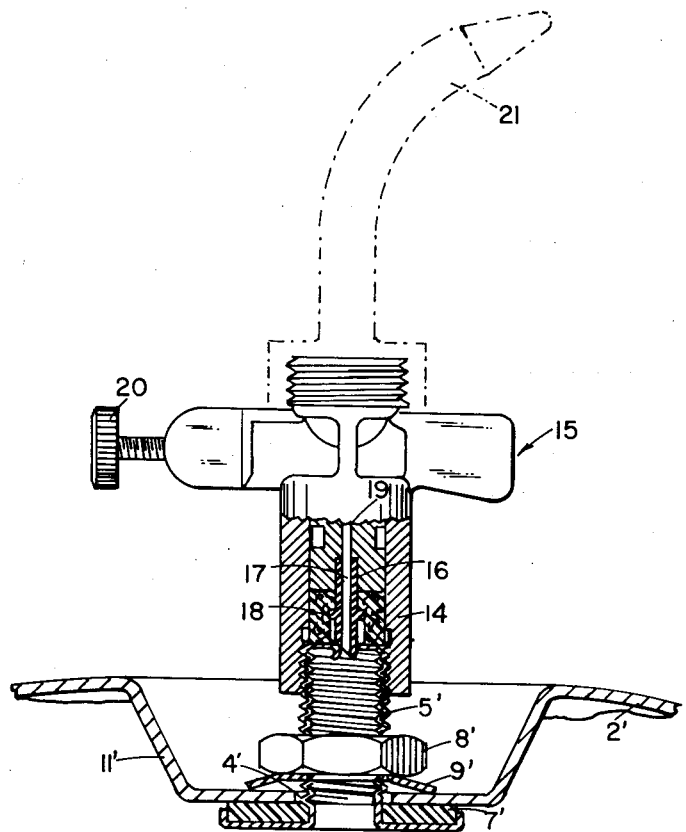
FIG. 5 is a similar showing of the assembly of FIG. 4 with a valve attachment secured thereto.

In FIGS. 4 and 5 I have shown a tubular bolt 5', passing with clearance through a charging aperture 4' in a recessed portion 11' of canister wall 2', which in analogy with the preceding embodiment has a head 6' in contact with a gasket 7' and a spring washer 9' adjacent its nut 8'. The outer extremity of the tubular shank of bolt 5' is closed at 6". The filling operation proceeds, with the aid of a tube 10', as heretofore described. The convex wall 2' may be the top of the canister, in contradistinction to the concave bottom-forming wall 2 of FIGS. 1–3.

When charging is completed, the shank of bolt 5' is not broken off but is maintained intact; this shank may, if desired, be permanently joined to the nut 8' in some suitable manner, as by soldering. Preparatorily to the discharge of the canister, an internally threaded coupling sleeve 14 of a valve attachment 15 is screwed onto the projecting shank portion so that a pointed tubular projection 16 within the sleeve, having a passage 17, pierces the closed end 6" of the bolt to establish communication between the bore of bolt 6', leading to the interior of the canister, and the outlet channel 19 of the valve attachment. A packing 18 in sleeve 14 insures fluid-tight contact between the closure assembly 5'–9' and the attachment 14–19, the latter being provided with any conventional valve means 20 for regulating and blocking the outflow of fluid from its channel 19 through a nozzle 21 or similar extension.

Modifications of the specific constructions shown in the drawing and described above are, of course, possible with-

I claim:
1. In a container for the storage of a fluid, in combination, a wall provided with an aperture; a closure assembly for sealing said aperture after admission of said fluid therethrough into the interior of said container, said assembly including a tubular bolt having a bore communicating with the interior of said container traversing said aperture, said bolt having a head within said container overlying said aperture and a threaded shank projecting from said aperture exteriorly of said container, a nut threadedly engaging said shank along the exterior of said container, and resilient means on said bolt cooperating with said nut for blocking said aperture by urging said head against a surface of said wall surrounding said aperture within said container; and valve discharge means removably mountable on said shank exteriorly of said container, said discharge means comprising an attachment sleeve threadedly engageable with said shank and formed with a channel adapted to communicate with said bore for emptying stored fluid from said container.

2. In a container for the storage of a fluid, in combination, a wall provided with an aperture; a closure assembly for sealing said aperture after admission of said fluid therethrough into the interior of said container, said assembly including a tubular bolt having a bore communicating with the interior of said container traversing said aperture, said bolt having a head within said container overlying said aperture and a threaded shank projecting from said aperture exteriorly of said container, a nut threadedly engaging said shank along the exterior of said container, and resilient means on said bolt co-operating with said nut for blocking said aperture by urging said head against a surface of said wall surrounding said aperture within said container; and valve discharge means removably mountable on said shank exteriorly of said container, said discharge means comprising an attachment sleeve threadedly engageable with said shank, a tubular projection within said sleeve penetrating said bore and provided with a channel communicating therewith for emptying stored fluid from said container.

3. In a container for the storage of a fluid, in combination, a wall provided with an aperture; a closure assembly for sealing said aperture after admission of said fluid therethrough into the interior of said container, said assembly including a tubular bolt having a bore communicating with the interior of said container traversing said aperture, said bolt having a head within said container overlying said aperture and a threaded shank projecting from said aperture exteriorly of said container, a nut threadedly engaging said shank along the exterior of said container, and resilient means on said bolt co-operating with said nut for blocking said aperture by urging said head against a surface of said wall surrounding said aperture within said container, said bore being provided with a wall portion remote from said head and normally blocking said bore; and valve discharge means removably mountable on said shank exteriorly of said container, said discharge means comprising an attachment sleeve threadedly engageable with said shank, a pointed tubular projection within said sleeve perforating said wall portion and penetrating said bore and provided with a channel communicating therewith for emptying stored fluid from said container.

4. In a container for the storage of a fluid, the combination which comprises a wall of said container having an aperture and a closure assembly for sealing said aperture in the filled state of the container, said assembly including a tubular bolt having an outwardly projecting shank portion extending outwardly of said container through said aperture and a head within said container overlying said aperture, and a nut on said shank portion sealing said head against an interior wall of said container around said aperture, said shank portion being provided with a perforatable wall portion integral with said bolt remote from said head for normally blocking said bore.

5. In a container for the storage of a fluid, the combination which comprises a wall of said container having an aperture and a closure assembly for sealing said aperture in the filled state of the container, said assembly including a tubular bolt having an outwardly projecting shank portion extending outwardly of said container through said aperture and a head within said container overlying said aperture, a nut on said shank portion sealing said head against an interior wall of said container around said aperture, said shank portion being provided with a perforatable wall portion integral with said bolt remote from said head for normally blocking said bore; and a valve attachment on said shank portion provided with a tubular projection adapted to penetrate said wall portion and forming an outlet channel communicating with the interior of said container through said bolt.

6. The method of sealing a charging aperture in a wall of a filled fluid-storage container, comprising the steps of inserting a tubular bolt with an enlarged head into said aperture from within the container with peripheral clearance from the wall of said aperture, said bolt having a wall portion exteriorly of said container blocking the bore of said bolt; admitting fluid into said container by way of said aperture around said bolt; tightening a nut onto the projection portion of said bolt until a seal is formed between said head and said wall; and mounting a valve attachment on said projecting portion while piercing said wall portion with a pointed formation on said attachment whereby communication is established between said attachment and the interior of said container through said tubular bolt.

References Cited in the file of this patent
UNITED STATES PATENTS

| | | |
|---|---|---|
| 680,607 | Luis | Aug. 13, 1901 |
| 853,821 | McCormick | May 14, 1907 |
| 1,246,618 | Lannoye | Nov. 13, 1917 |
| 1,891,045 | Freygang | Dec. 13, 1932 |
| 1,907,188 | Bansdell | May 2, 1933 |
| 2,020,767 | Bullis | Nov. 12, 1935 |
| 2,071,815 | Chamberlain | Feb. 23, 1937 |
| 2,522,792 | Knocke | Sept. 19, 1950 |
| 2,667,993 | Ayres | Feb. 2, 1954 |
| 2,708,347 | Cameron | May 17, 1955 |
| 2,807,391 | Wrenn | Sept. 24, 1957 |
| 2,817,380 | Knohl | Dec. 24, 1957 |